United States Patent
Moffat et al.

(10) Patent No.: US 8,218,759 B2
(45) Date of Patent: Jul. 10, 2012

(54) SYSTEM AND METHOD FOR ENCRYPTING DATA

(75) Inventors: Darren James Moffat, Berkshire (GB); James P. Hughes, Palo Alto, CA (US)

(73) Assignee: Oracle America, Inc., Redwood City, CA (US)

(*) Notice: Subject to any disclaimer, the term of this patent is extended or adjusted under 35 U.S.C. 154(b) by 559 days.

(21) Appl. No.: 12/425,737

(22) Filed: Apr. 17, 2009

(65) Prior Publication Data

US 2010/0268960 A1   Oct. 21, 2010

(51) Int. Cl.
*H04K 1/00* (2006.01)
(52) U.S. Cl. .............................. 380/28; 713/181; 380/37
(58) Field of Classification Search .................... 380/28, 380/37, 30; 713/181
See application file for complete search history.

(56) References Cited

U.S. PATENT DOCUMENTS 5,673,319 A * 9/1997 Bellare et al. ................. 713/181
2008/0084996 A1 * 4/2008 Chen et al. ...................... 380/28

OTHER PUBLICATIONS

The Keyed-Hash Message Authentication Code (HMAC), Information Technology Laboratory, FIPS PUB 198, Mar. 6, 2002, pp. 1-13.*
Initialization vector—Wikipedia, the free encyclopedia; http://en.wikipedia.org/wiki/Initialization.vector. 2 Pages.
Cryptographic hash function—Wikipedia, the free encylopedia; http:/en.wikipedia.org/wiki/Crytographic_hash_function. 8 Pages.
Message authentication code—Wikipedia, the free encyclopedia; http://en.wikipedia.org/wiki/Message-authentication_code. 3 Pages.

* cited by examiner

*Primary Examiner* — Samson Lemma
(74) *Attorney, Agent, or Firm* — Brooks Kushman P.C.

(57) ABSTRACT

A method for encrypting data includes receiving a block of plaintext for a data set at one or more computers, acquiring a cryptographic key for the data set, generating an initialization vector for the block of plaintext based on the block of plaintext, and encrypting the block of plaintext using the cryptographic key and the initialization vector.

17 Claims, 1 Drawing Sheet

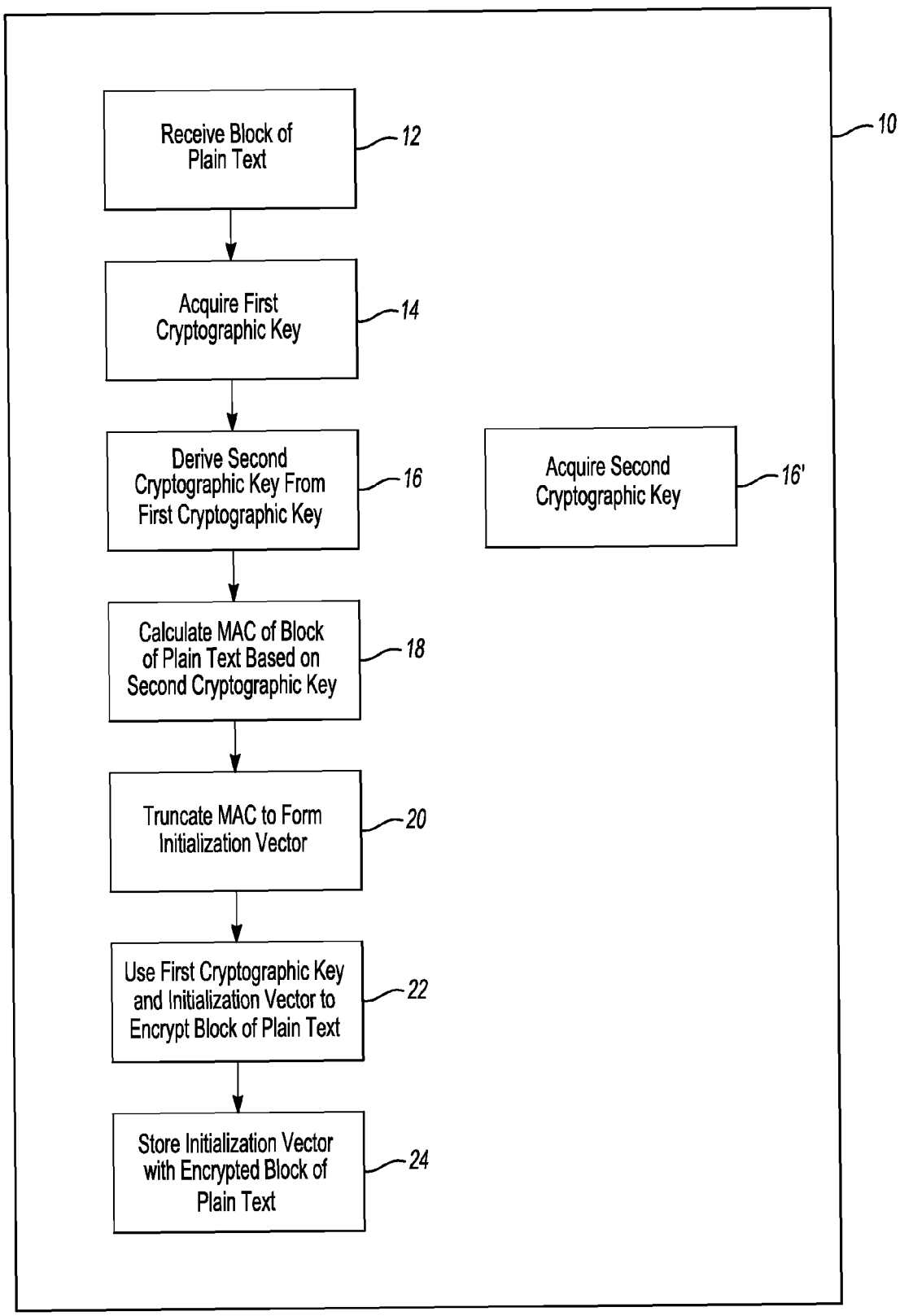

SYSTEM AND METHOD FOR ENCRYPTING DATA

BACKGROUND

In cryptography, an initialization vector (IV) is a block of bits required to allow a stream cipher or a block cipher to be executed in any of several streaming modes of operation to produce a unique stream independent from other streams produced by the same encryption key, without having to go through a re-keying process.

The size of the IV may depend on the encryption algorithm and on the cryptographic protocol in use. The IV may be as large as the block size of the cipher or as large as the encryption key. The IV must be known to the recipient of the encrypted information to be able to decrypt it. This can be ensured in a number of ways: by transmitting the IV along with the packet, by agreeing on it beforehand during the key exchange or the handshake, by calculating it, or by measuring such parameters as current time, IDs such as sender's and/or recipient's address, or ID, file ID, the packet, sector or cluster number, etc. A number of variables may be combined or hashed together depending on the protocol. If the IV is chosen at random, the cryptographer should take into consideration the probability of collisions, and if an incremental IV is used as a nonce, the algorithm's resistance to related-IV attacks should also be considered.

A cryptographic hash function is a deterministic procedure that takes an arbitrary block of data and returns a fixed-size bit string, the hash value, such that an accidental or intentional change to the data will almost certainly change the hash value. In many contexts, especially telecommunications, the data to be encoded is often called the "message," and the hash value is called the message digest or digest.

An ideal hash function may have the following properties: (i) easy to compute for any given data, (ii) difficult to construct a text that has a given hash, (iii) difficult to modify a given text without changing its hash, and (iv) unlikely that two different messages will have the same hash.

Cryptographic hash functions have many applications, such as message integrity checks, digital signatures, authentication, and various information security applications. Their hash values can also be used as fingerprints for detecting duplicate data files, file version changes, and similar applications, or as checksums to guard against accidental data corruption.

In various standards and applications, commonly used hash functions include MD5, SHA-1, and SHA-256.

A cryptographic message authentication code (MAC) is information used to authenticate a message. A MAC algorithm may accept as input a secret key and an arbitrary-length message to be authenticated, and output a MAC (tag). The MAC value protects both a message's data integrity as well as its authenticity by allowing verifiers (who also possess the secret key) to detect any changes to the message content.

A message integrity code (MIC) is frequently used as a substitute term for MAC, especially in communications, where the MAC acronym is traditionally used for Media Access Control. In certain contexts, however, MIC is a distinctly different term from MAC in that a secret key is not used in MIC operation, so a MIC should be encrypted during transmission if it is to be used as a reliable gauge of message integrity. A given message will always produce the same MIC assuming the same algorithm is used to generate both. Conversely, the same message can only generate matching MACs if the same secret key and initialization vector are used with the same algorithms to generate both. MICs do not use secret keys and, when taken on their own, may be a less reliable gauge of message integrity. A MAC that uses a secret key does not necessarily need to be encrypted to provide the same level of assurance.

While MAC functions are similar to cryptographic hash functions, they may possess different security requirements. To be considered secure, a MAC function should resist existential forgery under chosen-plaintext attacks. This means that even if an attacker has access to an oracle which possesses the secret key and generates MACs for messages of the attacker's choosing, he cannot guess the MAC for any message that he has not yet asked the oracle about without doing an infeasible amount of computation.

MACs differ from digital signatures as MAC values are both generated and verified using the same secret key. This implies that the sender and receiver of a message should agree on keys before initiating communications, as is the case with symmetric encryption. For the same reason, MACs may not provide the property of non-repudiation offered by signatures: any user who can verify a MAC is also capable of generating MACs for other messages. In contrast, a digital signature is generated using the private key of a key pair, which is asymmetric encryption. Since this private key is only accessible to its holder, a digital signature proves that a document was signed by none other than that holder. Thus, digital signatures do offer non-repudiation.

MAC algorithms can be constructed from other cryptographic primitives, such as cryptographic hash functions (as in the case of HMAC) or from block cipher algorithms (OMAC, CBC-MAC and PMAC). Some MAC algorithms, however, are constructed based on universal hashing.

A keyed-Hash Message Authentication Code (HMAC or KHMAC) is a type of MAC calculated using a specific algorithm involving a cryptographic hash function in combination with a secret key. As with any MAC, it may be used to simultaneously verify both the data integrity and the authenticity of a message. Any iterative cryptographic hash function, such as MD5 or SHA-1, may be used in the calculation of an HMAC. The resulting MAC algorithm is termed HMAC-MD5 or HMAC-SHA1 accordingly. The cryptographic strength of the HMAC may depend upon the cryptographic strength of the underlying hash function, the size and quality of the key, and the size of the hash output length in bits.

An iterative hash function breaks up a message into blocks of a fixed size and iterates over them with a compression function. For example, MD5 and SHA-1 operate on 512-bit blocks. The size of the output of HMAC is the same as that of the underlying hash function (128 or 160 bits in the case of MD5 or SHA-1, respectively), although it can be truncated if desired. Truncating the hash image may reduce the security of the MAC which is bounded above by the birthday attack.

SUMMARY

A system for encrypting data includes one or more computers configured to receive a block of plaintext for a data set, acquire a first cryptographic key for the data set, and one of (i) derive a second cryptographic key for the data set from the first cryptographic key, and (ii) acquire a second cryptographic key for the data set. The one or more computers are further configured to calculate a message authentication code of the block of plaintext based on the second cryptographic key to form an initialization vector for the block of plaintext, and encrypt the block of plaintext using the first cryptographic key and the initialization vector.

A method for encrypting data includes receiving a block of plaintext for a data set at one or more computers, acquiring a cryptographic key for the data set, generating an initialization vector for the block of plaintext based on the block of plaintext, and encrypting the block of plaintext using the cryptographic key and the initialization vector.

A computer-readable storage medium has information stored thereon for directing one or more computers to receive a block of plaintext for a data set, acquire a first cryptographic key for the data set, and one of (i) derive a second cryptographic key for the data set from the first cryptographic key, and (ii) acquire a second cryptographic key for the data set. The storage medium also has information stored thereon for directing the one or more computers to generate an initialization vector for the block of plaintext based on the block of plaintext and the second cryptographic key, and encrypt the block of plaintext using the first cryptographic key and the initialization vector.

While example embodiments in accordance with the invention are illustrated and disclosed, such disclosure should not be construed to limit the invention. It is anticipated that various modifications and alternative designs may be made without departing from the scope of the invention.

BRIEF DESCRIPTION OF THE DRAWING

FIG. 1 is a block diagram depicting an example algorithm for encrypting data.

DETAILED DESCRIPTION

ZFS is a file system designed by Sun Microsystems for the Solaris Operating System. The features of ZFS may include support for high storage capacity, integration of the concepts of file system and volume management, snapshots and copy on write (COW) clones, on-line integrity checking and repair, and RAID-Z.

Unlike traditional file systems, which may reside on single devices and thus require a volume manager to use more than one device, ZFS file systems are built on top of virtual storage pools referred to as zpools. A zpool is constructed of virtual devices (vdevs), which are themselves constructed of block devices: files, hard drive partitions or entire drives.

Block devices within a vdev may be configured in different ways, depending on need and space available: non-redundantly (similar to RAID 0), as a mirror (RAID 1) of two or more devices, as a RAID-Z (similar to RAID 5 with regard to parity) group of three or more devices, or as a RAID-Z2 (similar to RAID 6 with regard to parity) group of four or more devices. The storage capacity of all vdevs may be available to all of the file system instances in the zpool.

ZFS uses a COW transactional object model. All block pointers within the file system may contain a 256-bit checksum of the target block which is verified when the block is read. Blocks containing active data are not overwritten in place. Instead, a new block is allocated, modified data is written to it, and then any metadata blocks referencing it are similarly read, reallocated and written. To reduce the overhead of this process, multiple updates may be grouped into transaction groups. An intent log may be used when synchronous write semantics are required.

If ZFS writes new data, the blocks containing the old data may be retained, allowing a snapshot version of the file system to be maintained. ZFS snapshots may be created quickly, since all the data composing the snapshot is already stored. They may also be space efficient, since any unchanged data is shared among the file system and its snapshots.

Writeable snapshots ("clones") may also be created, resulting in two independent file systems that share a set of blocks. As changes are made to any of the clone file systems, new data blocks may be created to reflect those changes. Any unchanged blocks continue to be shared, no matter how many clones exist.

ZFS employs dynamic striping across all devices to maximize throughput. As additional devices are added to the zpool, the stripe width automatically expands to include them. Thus all disks in a pool are used, which balances the write load across them.

ZFS uses variable-sized blocks of up to 128 kilobytes. Currently available code allows an administrator to tune the maximum block size used as certain workloads may not perform well with large blocks.

If data compression is enabled, variable block sizes are used. If a block can be compressed to fit into a smaller block size, the smaller size is used on the disk to use less storage and improve I/O throughput (though at the cost of increased CPU use for the compression and decompression operations).

In ZFS, file system manipulation within a storage pool may be less complex than volume manipulation within a traditional file system. For example, the time and effort required to create or resize a ZFS file system is closer to that of making a new directory than it is to volume manipulation in some other systems.

When encrypting data using symmetric ciphers (such as AES), most algorithm modes used for encrypting file system data require an initialization vector (IV). (As known in the art, the Advanced Encryption Standard (AES) is an encryption standard adopted by the U.S. government. The standard comprises three block ciphers, AES-128, AES-192 and AES-256, adopted from a larger collection originally published as Rijndael. Each AES cipher has a 128-bit block size, with key sizes of 128, 192 and 256 bits, respectively.) The IV is used to ensure that the same plaintext encrypted with the same key results in different cipher text when encrypted at different times and when placed at different "disk" locations. This may protect against precalculation attacks and other cipher text based attacks. The IV is usually either stored with the cipher text or generated as a function of other data stored with the cipher text.

Traditional IV generation should preclude cipher text based data deduplication because the fingerprints for detecting duplicate data files will be different. That is, identical plaintext blocks will have different cipher text blocks.

To support cipher text based data deduplication for data sets using the same encryption key, a strategy for generating a cryptographically secure IV is needed, for example, for modes the require a non-repeating IV (such as AES CCM and GCM modes) but one that may ensure that the same plaintext uses the same IV. (As known in the art, AES CCM mode (Counter with CBC-MAC) is a mode of operation for cryptographic block ciphers. It is an authenticated encryption algorithm designed to provide both authentication and privacy. CCM mode is only defined for block ciphers with a block length of 128 bits. In RFC 3610, it is defined for use with AES. As also known in the art, GCM mode (Galois/Counter Mode) is a mode of operation for symmetric key cryptographic block ciphers. It is an authenticated encryption algorithm designed to provide both authentication and privacy. GCM mode is defined for block ciphers with a block size of 128 bits.) If a different encryption key is used, then the same plaintext should result in a different IV being generated as this protects against known plaintext guessing attacks.

Encryption systems for file systems often use IV's generated as a function over the storage block or other transactional information that uniquely identifies a given disk block for a data set. In order to enable deduplication of encrypted data sets in the ZFS file system (or other suitable file system, e.g. TrueCrypt, Windows NT File System, etc.), a strategy of IV generation is needed that meets the requirements of, for example, AES (for ZFS specifically, the CCM and GCM modes as mentioned above). Both the CCM and GCM AES modes require an IV that is guaranteed not to repeat for a given key.

For data sets that are not tagged for deduplication in certain embodiments, a truncated (to, for example, 96 bits for AES CCM), unkey'd SHA256 message digest of the object set, object, blkid, and the transaction group the block is written in may be used to generate the IV. This is an example of an IV that does not require additional space for the IV. This will result in cipher text blocks that are not able to be deduplicated as the compaction of the inputs into the SHA256 message digest are unique for every given block (plaintext or cipher text).

For data sets that are tagged for deduplication in certain embodiments, a key'd SHA256 message digest (HMAC-SHA256) of the full plaintext block, for example, may be used to generate the IV. The HMAC key may be derived from the data encryption key. Use of an HMAC, for example, rather than a simple unkey'd message digest may better protect against precalculation attacks based on known plaintext being stored in a data set. Since the IV is only able to be calculated from the plaintext, it may require additional storage and may need to be stored with the cipher text blocks rather than generated from other file system metadata.

Data encrypted using the same key may be deduplicated when the plaintext is the same without using an IV/nonce that may weaken cipher modes such as CCM or GCM.

Referring now to FIG. 1, one or more computers 10 may execute the example algorithm depicted in flow chart form. As indicated at 12, a block of plaintext for a data set is received. For example, data or a metadata block arrives in the zio pipeline and the encryption transform is added to the list of operations to do before writing to disk.

As indicated at 14, a first cryptographic key for the data set is acquired. For example, the AES data set encryption key for this transaction group may be looked up in the memory keystore.

As indicated at 16, a second cryptographic key for the data set is derived from the first cryptographic key. For example, an HMAC-SHA256 key may be derived from the AES data set encryption key using data set guide as the data and AES in electronic codebook (ECB) mode (i.e., no IV), and again in cipher-block chaining (CBC) mode with first round output as the IV. (As known in the art, in ECB mode the message is divided into blocks and each block is encrypted separately. As also known in the art, in CBC mode each block of plaintext is XORed with the previous cipher text block before being encrypted. Each cipher text block is dependent on all plaintext blocks processed up to that point. To make each message unique, an initialization vector should be used in the first block.) The resulting key, in this example, should be 256 bits in length. Of course, other suitable techniques may be used.

Alternatively, as indicated at 16', a second cryptographic key may be acquired. For example, an HMAC-256 key may be found in the memory keystore mentioned at 14. This HMAC-256 key may have been randomly generated at the time the data set was generated and stored in wrapped form with the key from 14.

As indicated at 18, a message authentication code of the block of plaintext is calculated based on the second cryptographic key. For example, a standard HMAC-SHA256, UMAC-96, UMAC-128, XCBC, AEC-CMAC-96, etc., may be performed over the block of plaintext using the key derived at 16.

In other embodiments, a hash, e.g., UHASH-96, Tiger hash, etc., or checksum, e.g., SHA-256, etc., may be calculated based on the plaintext. As apparent to those of ordinary skill, a second cryptographic key (such as those discussed with reference 16, 16') is not needed as the hash or checksum operations do not require a key. In these embodiments, however, a predictable IV may be generated in the case where an attacker can guess the plaintext.

As indicated at 20, the message authentication code is truncated to a specified length to form an initialization vector for the block of plaintext. For example, the HMAC-SHA256 output is truncated to the required length for the IV (in this example, 96 bits). In other embodiments, however, the message authentication code (or checksum, hash, etc.) may be generated such that truncation is not necessary. That is, the message authentication code, checksum, hash, etc., may be selected such that the output is of the required length for the IV. For example, a UMAC-96 output, in the above example, would not need to be truncated as its length is 96 bits.

As indicated at 22, the first cryptographic key and the initialization vector are used to encrypt the block of plaintext. For example, an AES CCM encryption of the plaintext block is performed using the IV generated at 20 as the CCM nonce.

As indicated at 24, the initialization vector is stored with the encrypted block of plaintext. For example, the IV is stored in the block pointer for the block of cipher text.

As apparent to those of ordinary skill, the algorithms disclosed herein may be deliverable to a processing device in many forms including, but not limited to, (i) information permanently stored on non-writable storage media such as ROM devices and (ii) information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), state machines, controllers or other hardware components or devices, or a combination of hardware, software and firmware components.

While embodiments of the invention have been illustrated and described, it is not intended that these embodiments illustrate and describe all possible forms of the invention. For example, while certain embodiments described herein were discussed within the context of ZFS, other embodiments may be implemented in different contexts such as TrueCrypt, Windows NT File System, etc. The words used in the specification are words of description rather than limitation, and it is understood that various changes may be made without departing from the spirit and scope of the invention.

What is claimed is:

1. A system for encrypting data comprising:
   one or more computers configured to
      receive a block of plaintext for a data set,
      acquire a first cryptographic key for the data set based on an identifier of the data set and an identifier of a transaction group for the data set,
      one of (i) derive a second cryptographic key for the data set from the first cryptographic key, and (ii) acquire a second cryptographic key for the data set,
      calculate a message authentication code of the block of plaintext based on the second cryptographic key to form an initialization vector for the block of plaintext, encrypt the block of plaintext using the first cryptographic key and the initialization vector to generate cipher text, and store the initialization vector and cipher text with the identifier of the data set and the identifier of the transaction group.

2. The system of claim 1 wherein the one or more computers are further configured to truncate the message authentication code to a specified length.

3. The system of claim 1 wherein the message authentication code is a keyed-hash message authentication code.

4. The system of claim 1 wherein the message authentication code is a universal-hash message authentication code.

5. The system of claim 1 wherein the message authentication code is a cipher-based message authentication code.

6. A method for encrypting data comprising:

receiving a block of plaintext for a data set at one or more computers, acquiring a cryptographic key for the data set based on an identifier of the data set and an identifier of a transaction group for the data set, generating an initialization vector for the block of plaintext based on the block of plaintext, encrypting the block of plaintext using the cryptographic key and the initialization vector to generate cipher text, and storing the initialization vector and cipher text with the identifier of the data set and the identifier of the transaction group.

7. The method of claim 6 wherein generating an initialization vector for the block of plaintext includes calculating a checksum or hash of the block of plaintext.

8. The method of claim 7 further comprising truncating the checksum or hash to a specified length.

9. The method of claim 7 wherein the checksum is a SHA-256.

10. The method of claim 7 wherein the hash is a UHASH-96.

11. The method of claim 7 wherein the hash is a Tiger hash.

12. A non-transitory computer-readable storage medium having information stored thereon for directing one or more computers to receive a block of plaintext for a data set, acquire a first cryptographic key for the data set based on an identifier of the data set and an identifier of a transaction group for the data set, one of (i) derive a second cryptographic key for the data set from the first cryptographic key, and (ii) acquire a second cryptographic key for the data set, generate an initialization vector for the block of plaintext based on the block of plaintext and the second cryptographic key, and encrypt the block of plaintext using the first cryptographic key and the initialization vector to generate cipher text, and store the initialization vector and cipher text with the identifier of the data set and the identifier of the transaction group.

13. The medium of claim 12 wherein generating an initialization vector for the block of plaintext includes calculating a message authentication code of the block of plaintext.

14. The medium of claim 13 further having information stored thereon for directing the one or more computers to truncate the message authentication code to a specified length.

15. The medium of claim 13 wherein the message authentication code is a keyed-hash message authentication code.

16. The medium of claim 13 wherein the message authentication code is a universal-hash message authentication code.

17. The medium of claim 13 wherein the message authentication code is a cipher-based message authentication code.

* * * * *